A. WHITE.
DIRIGIBLE HEADLIGHT FOR AUTOMOBILES.
APPLICATION FILED MAR. 13, 1917.

1,258,842.

Patented Mar. 12, 1918.
2 SHEETS—SHEET 1.

Inventor
Allen White

By C. S. Haskins
Attorney

A. WHITE.
DIRIGIBLE HEADLIGHT FOR AUTOMOBILES.
APPLICATION FILED MAR. 13, 1917.
1,258,842.
Patented Mar. 12, 1918.
2 SHEETS—SHEET 2.
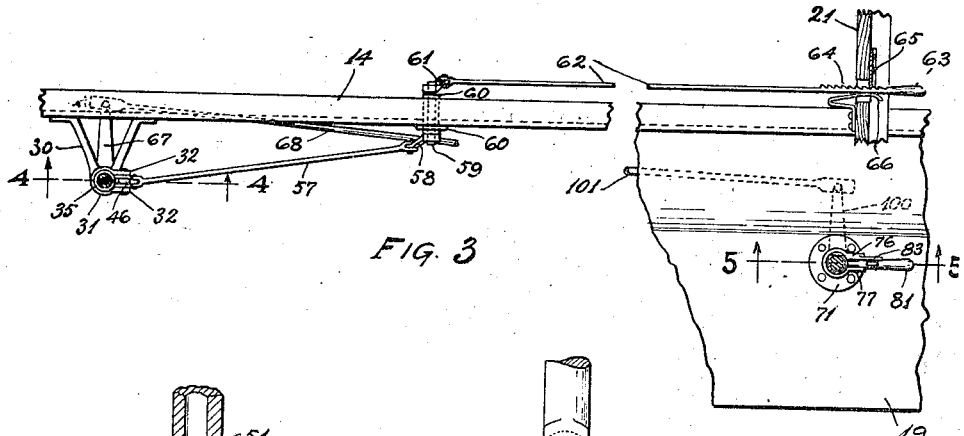
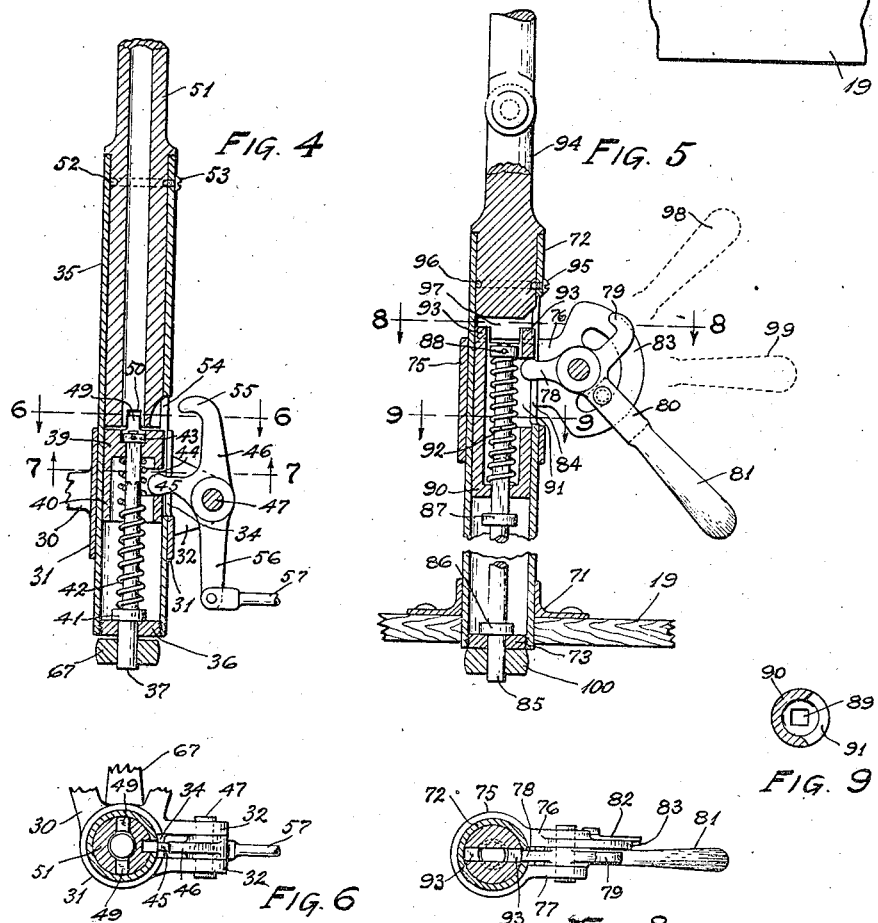
Inventor
Allen White
By C. D. Haskins
Attorney

UNITED STATES PATENT OFFICE.

ALLEN WHITE, OF OLYMPIA, WASHINGTON.

DIRIGIBLE HEADLIGHT FOR AUTOMOBILES.

1,258,842.  Specification of Letters Patent.  Patented Mar. 12, 1918.

Application filed March 13, 1917. Serial No. 154,627.

*To all whom it may concern:*

Be it known that I, ALLEN WHITE, a citizen of the United States, residing at Olympia, in the county of Thurston and State of Washington, have invented a certain new and useful Improvement in Dirigible Headlights for Automobiles, of which the following is a specification.

My invention relates to improvements in dirigible headlights for automobiles, and the object of my invention is to provide lamps and mechanism which shall be adapted to be operatively associated with an automobile and its steering mechanism in such manner that two of said lamps shall be adjustably adapted (simultaneously or dissimultaneously as may be required) to move rotatively to change the direction of their rays of light in response to changes in the direction toward which said automobile may be moving; and that one of said lamps shall be adapted to be independently actuated manually to direct rays of light toward any desired direction.

I accomplish this object by devices illustrated in the accompanying drawings wherein—

Fig. 3 is an enlarged view in horizontal sections of parts of the same on broken line 3, 3 of Fig. 2;

Fig. 4 is an enlarged view in vertical section of parts of the same;

Fig. 5 is an enlarged view in vertical section of other parts of the same;

Figures 1, 2:
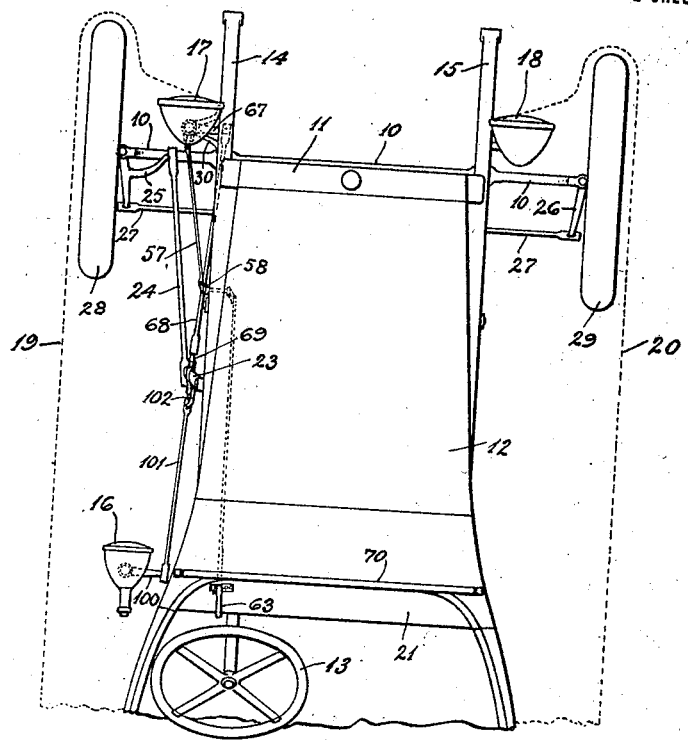
Figure 1 is a fragmentary plan view of an automobile with which are associated devices embodying my invention.
Fig. 2 is a view in side elevation of the same.

Fig. 6 is an enlarged view in horizontal section on broken line 6, 6 of Fig. 4;

Fig. 7 is an enlarged view in horizontal section on broken line 7, 7 of Fig. 4 of one detail of my invention;

Fig. 8 is an enlarged view in horizontal section on broken line 8, 8 of Fig. 5 showing other details of the same; and Fig. 9 is an enlarged view in horizontal section on broken line 9, 9 of Fig. 5, showing another detail of the same.

Referring to the drawings throughout which like reference numerals indicate like parts, Figs. 1 and 2 represent the forward half portion of an automobile including the front axle 10, radiator 11, engine housing 12, the steering wheel 13, side rails 14 and 15 of the chassis, lamps 16, 17 and 18 the oppositely disposed running boards, which are indicated in outline by dotted lines 19 and 20, respectively, in Figs. 1 and 2, a fragment of the running board 19 being shown by full lines in Fig. 3.

Operatively associated with the steering wheel 13, in a well known manner not shown, is a shaft 22, which projects outwardly through the side rail 14 of the chassis, and rigidly secured to the outwardly projected end portion of said shaft 22 is a downwardly extending arm 23.

The lower end portion of the arm 23 is articulated with the rearward end portion of a connecting rod 24 whose forward end is articulated to an arm 25 that is integral with a member of the steering knuckle of one end portion of the front axle 10 whose other end portion is provided with a similar steering knuckle having an arm 26 which is operatively connected with the arm 25 by a connecting rod 27, whereby, in a well known manner, the front wheels 28 and 29 may be caused to act simultaneously to turn toward a desired direction.

Fastened to the outer side surface of the front end portion of the side rail 14 is a bracket 30 having a vertically disposed sleeve 31 integral therewith, which sleeve 31 is provided with two integral lugs 32 that extend in parallel lines rearwardly therefrom.

Registering with the space between the lugs 32 the sleeve 31 is provided with a slot 34 extending from its top end downwardly to a plane near the bottom edges of said lugs 32, as indicated in Figs. 4 and 6.

Fixed within the sleeve 31 is a tubular socket 35, within whose bottom end is a shaft bearing 36, within which is rotatably disposed a shaft 37 which extends upwardly therefrom to a point adjacent to the plane of the top end surface of the sleeve 31, the upper end portion of said shaft 37 being of square cross-section and projected through a square hole 38 that is concentrically disposed to extend through the upper end portion of a plunger 39 which is provided with a downwardly extended annular flange 40, which plunger 39 is thus adapted to make rotative movements in response to rotative movements of the shaft 37.

Within the socket 35, the shaft 37 is provided with an integral collar 41 which rests upon the shaft bearing 36, and surrounding said shaft 37 is a helical compression spring 42 which extends upwardly from the top surface of the collar 31 to the under surface of the plunger 39 thereby normally to press said plunger 39 against a removable collar 43 that is fastened on the upper end of the shaft 37.

The rearward portion of the annular flange 40, of the plunger 39, is provided with an opening 44 formed by cutting away a segmental portion of said flange 40 to admit into said opening an arm 45 which is integral with a lever 46 that is pivotally mounted between the lugs 32 by means of a pivot 47 which extends through said lugs 32 and through said lever 46, as shown more clearly in Fig. 6.

The arm 45 is adapted to engage with the surface of the lower edge of said opening 44 whereby a downward movement of said arm 45 will cause the plunger 39 to be forced downwardly against the pressure of the spring 42.

The plunger 39 is provided with oppositely disposed lugs 49 which project upwardly from its top surface to project into slots, like the slot 50, that are formed in the bottom end of a lamp support 51 that is rotatably disposed in the upper portion of the socket 35.

The lamp support 51, within the socket 35, is provided with a groove 52, within which projects the rounded end of a screw 53 which is screwed through the upper end portion of the cylindrical wall of the socket 35, as indicated in Fig. 4.

At a point adjacent to the upper end of the sleeve 31 the rearward side of the wall of the socket 35 is provided with a slotted opening 54, and opposite said opening 54 the lower end of the lamp support 51 is also provided with a slot whereby a curved arm 55, that is integral with the lever 46, may project through said slotted opening 54 and into the slot formed in the lower portion of the lamp support 51, whereby in response to a forward movement of the arm 55, the lamp support 51 shall be prevented from making rotative movements, but at the same time the arm 45 will have moved downwardly to depress the plunger 39 thereby to cause its lugs 49 to withdraw from the slots 50, thus to permit the plunger 39 to make rotative movements without communicating rotative movements to the lamp support 51.

The lever 46 is provided with another integral arm 56 which extends downwardly to make a pivotal connection with one end of a connecting rod 57 which extends rearwardly to connect with an arm 58 which is fastened on a shaft 59 that is rotatively movable in a bearing 60 that extends through the side rail of the chassis, as shown more clearly in Fig. 3.

The shaft 59 projects out of the inner end of said bearing 60 and on said outwardly projecting portion is fastened another arm 61 to which is articulated the forward end of a controlling rod 62, which extends rearwardly and obliquely upward to project its rearward end portion through the instrument board 21 which is disposed, in a well known manner, in front of the operator's seat of the automobile.

The outwardly projecting rearward end portion of the controlling rod 62 is of the form of a handle 63 which may be grasped by the operator of the automobile at times desired to move rearwardly said controlling rod 62 to swing the lever 46 to cause the arm 45 to disengage the lugs 49 from the slots 50 and to cause the arm 55 to lock the lamp support 51 against rotative movements, and at other desired times to move said rod 62 forwardly and in an obvious manner to actuate the lever 46 to unlock the lamp support 51 and permit the lugs 49 to enter the slots 50 whereby the lamp support 51 may be rotatively moved in response to a rotative movement of the shaft 37.

The controlling rod 62 adjacent to its handle 63 is provided with a series of detent notches 64 that are adapted to engage with the edge of a detent plate 65 that is fixed on the instrument board 21, such engagement being insured by the pressure of a spring 66 which is disposed as shown in Fig. 3.

The shaft 37 projects downwardly out of the bearing 36 and on its downwardly projecting end portion is fastened an arm 67 that projects inwardly beneath the side rail 14, and to such inwardly projecting end is articulated the forward end of a connecting rod 68 whose rearward end is articulated with an arm 69, by means of a ball joint, said arm 69 being clamped to the arm 23 which is associated with the steering mechanism, whereby, in an obvious manner, the shaft 37 will be rotatively moved in response to a rotative movement of the steering wheel 13.

Fastened to the top surface of the running board 19, at a point in a vertical line near the plane of the wind shield 70, is a bracket 71, within which is fixed a tubular socket 72 whose lower end portion projects downwardly through the running board 19 and is provided with a shaft bearing 73.

The tubular socket 72 extends vertically upward from the bracket 71 to a point adjacent to the horizontal plane of the top edge of the side door 74 of the automobile and fixed to its top end portion is a bracket 75 that is provided with two spaced lugs 76 and 77 that extend rearwardly therefrom.

Pivotally mounted on said lugs 76 and 77 and disposed therebetween is a lever having three arms 78, 79 and 80, to the arm 80 of which is attached a handle 81, as shown in Figs. 5 and 8.

Secured to the inner side of the arm 80 is a friction spring 82 which engages with a sector 83 that is integral with the lug 76 which friction spring 82 serves to detain the arm 80 of said lever in a desired one of different angular positions.

Extending through the rearward side of the tubular socket 72, in a position registering with the space between the lugs 76 and 77, is a vertically slotted opening 84, through which may be projected a desired one of the arms 78 and 79 in response to a swinging movement of the handle 81.

Rotatably mounted in the bearing 73 is a shaft 85 whose lower end projects downwardly through and out of said bearing 73; and said shaft 85 extends upwardly within the tubular socket 72 to terminate at a point slightly above the plane of the fulcrumed point of the lever carrying the arms 78, 79 and 80.

The shaft 85 is provided with a collar 86 that rests on the top surface of the bearing 73, and is further provided with another collar 87 that is fastened thereon at a point spaced from its upper end, which upper end is provided with a head 88.

The shaft 85, in that portion adjacent to and above the collar 87, is of square cross-section to adapt it slidably to fit a square hole 89 in the bottom end of a hollow plunger 90 which is rotatably and slidably disposed to fit within the tubular socket 72.

Extending through the rearward portion of the annular wall of the plunger 90 is a segmentally formed opening 91 into which the arm 78 may extend to cause the surface of the wall of the upper side of said opening to engage with and rest upon the top surface of the end portion of said arm 78 whereby said plunger may be raised against the force of a helical compression spring 92 that extends between the bottom wall of the plunger 90 and the underside of the head 88 in response to a downward movement of the handle 81.

The top end of the plunger 90 is provided with two oppositely disposed lugs 93 which are adapted to project into a transverse slot formed in the bottom end of a lamp holder 94 whose lower end portion is rotatably mounted in the upper end portion of the tubular socket 72 where it is confined with respect to vertical movements by a screw 95 that projects through the wall of the tubular socket 72 into a groove 96 that extends around the periphery of the lamp holder 94, as shown more clearly in Fig. 5.

The bottom end portion of the lamp holder 94 is provided with a radial slot 97 into which the end of the arm 79 may be projected in response to a disposition of the handle 81 at the angle indicated by the dotted line 98, whereby the lamp holder 94 will be prevented from a rotative movement, since, with the handle 81 in the position indicated by the dotted line 98, the arm 78 will be lowered to permit the force of the spring 92 to force the plunger 90 downwardly to disengage its lugs 93 from the slots in the lower end of said lamp holder 94.

If the handle 81 be brought to the position of the dotted lines 99, shown in Fig. 5, then the arms 78 and 79 will be in positions that will disengage the lugs 93 from the slots in the bottom end of the lamp holder 94 and at the same time permit said lamp holder 94 to be manually rotated in the tubular socket 72.

Fastened on the outwardly projecting bottom end portion of the shaft 85 is an arm 100 that projects inwardly at right angles therefrom and to the inner end of said arm 100 is articulated the rearward end of a connecting rod 101 whose forward end is articulated by a ball joint with an arm 102 that is clamped to the arm 23 of the steering mechanism whereby in response to a rotative movement of the steering wheel 13 the shaft 85 will be rotatively moved, thus at required times to rotatively move the lamp holder 94 if the handle 81 be in the position shown in full lines in Fig. 5.

Hinged to the upper end of the lamp holder 94 is a lamp 16 that is adapted to swing in vertical planes.

Thus, both of the lamps 16 and 17 may be actuated rotatively to move synchronously in horizontal planes in response to rotative movements of the steering wheel 13, or either of the two lamps 16 and 17, as may be desired, may be caused independently and rotatively to move in a horizontal plane in response to rotative movements of said steering wheel 13, and further the lamp 16 may be manually swung in a vertical plane or rotated in a horizontal plane independently of said lamp 17 and either of said lamps 16 and 17 may be removed from the tubular lamp holders 72 and 35, respectively, by removing a respective one of the screws 95 and 53.

I have shown the lamps 16 and 17 together with their associated mechanism as being disposed on the left hand side of an automobile, but it is manifest that like devices may be disposed on both sides of an automobile, or only on a desired one of the sides of said automobile.

Obviously, changes may be made in the forms, dimensions and arrangement of parts of my invention without departing from the spirit thereof.

What I claim is:

1. Dirigible light mechanism including a tubular socket, a lamp mount rotatable therein, a sliding clutch member positioned in the lower end of said socket and in detachable engagement with said lamp mount, the wall of said socket having a vertical elongated slot therein, a lever extending through and movable in said slot to shift the sliding clutch member out of engagement with said lamp mount, and means for rotating the sliding clutch member.

2. Dirigible light mechanism including a tubular socket, a lamp mount rotatable therein, a lamp carried by said mount, a sliding member positioned in the lower end of said socket, in detachable engagement with said lamp mount, the wall of said socket having a vertical slot therein, means extending through said slot to shift the sliding member out of engagement with said lamp mount, said means including a pivoted arm having a pair of fingers engaging respectively the lamp mount to hold the same stationary, and the sliding member to shift same, and means for rotating the sliding member.

3. Dirigible light mechanism including a tubular socket, a lamp mount rotatable therein, a lamp carried by said mount, a sliding member positioned in the lower end of said socket, in detachable engagement with said lamp mount, the wall of said socket having a vertical slot therein, means extending through said slot to shift the sliding member out of engagement with said lamp mount, means for rotating the sliding member, and steering mechanism operatively associated therewith.

4. Dirigible light mechanism including a tubular socket, a lamp mount rotatable therein, a lamp carried by said mount, a sliding member positioned in the lower end of said socket, in detachable engagement with said lamp mount, the wall of said socket having a vertical slot therein, means extending through said slot to shift the sliding member out of engagement with said lamp mount, said means including a pivoted arm having a pair of fingers engaging respectively the lamp mount to hold the same stationary, the sliding member to shift same, and means for rotating the sliding member, and steering mechanism operatively associated therewith.

5. Dirigible light mechanism including a tubular socket, a lamp mount rotatable therein, a shaft having a rectangular upper end journaled in the lower end of said socket, a tensioned plunger having a rectangular opening received on the upper end of said shaft, interlocking connections between said lamp mount and plunger, and means for disconnecting the lamp mount and plunger.

6. Dirigible light mechanism including a tubular socket, a lamp mount rotatable therein, a shaft having a rectangular upper end journaled in the lower end of said socket, a tensioned plunger having a rectangular opening received on the upper end of said shaft, interlocking connections between said lamp mount and plunger, means for disconnecting the lamp mount and plunger, the said means carrying an arm adapted for engagement with said lamp mount to prevent rotary movement thereof.

7. Dirigible light mechanism including a tubular socket, a lamp mount rotatable therein, a shaft having a rectangular upper end journaled in the lower end of said socket, a tensioned plunger having a rectangular opening received on the upper end of said shaft, interlocking connections between said lamp mount and plunger, means for disconnecting the lamp mount and plunger, and steering mechanism associated with said shaft.

8. Dirigible light mechanism including a tubular socket, a lamp mount rotatable therein, a shaft having a rectangular upper end journaled in the lower end of said socket, a tensioned plunger having a rectangular opening received on the upper end of said shaft, interlocking connections between said lamp mount and plunger, means for disconnecting the lamp mount and plunger, the said means carrying an arm adapted for engagement with said lamp mount to prevent rotary movement thereof, and steering mechanism associated with said shaft.

9. Dirigible light mechanism including a vertical rotatable lamp mount, an alined vertical operating shaft therefor, a clutch for connecting said shaft and said mount, means to move said clutch to its position wherein said shaft and said mount are connected, and means to operate said clutch to disconnect said shaft and said mount, one of said means including a lever provided with a rigid arm to directly engage said mount and hold the same against rotation when the shaft and mount are disconected.

10. Dirigible automobile light mechanism including a rotatable light mount, operating connections between said mount and the steering mechanism of the automobile and including a clutch member, and means to operate said clutch member to disconnect said mount from its operating connection, said means including a lever operable either to move said clutch member to allow free manual rotation of said mount or to directly engage the mount to prevent rotation thereof.

In witness whereof, I hereunto subscribe my name this 2nd day of March, A. D. 1917.

ALLEN WHITE.